United States Patent
Pei

(10) Patent No.: US 8,590,030 B1
(45) Date of Patent: Nov. 19, 2013

(54) CREDENTIAL SEED PROVISIONING SYSTEM

(75) Inventor: Mingliang Pei, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 171 days.

(21) Appl. No.: 13/086,946

(22) Filed: Apr. 14, 2011

(51) Int. Cl.
    *H04L 29/06* (2006.01)

(52) U.S. Cl.
    USPC .......................................................... 726/9

(58) Field of Classification Search
    USPC ................................................ 726/1–3, 5, 9
    See application file for complete search history.

(56) References Cited

U.S. PATENT DOCUMENTS

| | | | | |
|---|---|---|---|---|
| 5,440,758 | A * | 8/1995 | Grube et al. | 455/9 |
| 5,915,086 | A * | 6/1999 | Buzsaki et al. | 726/28 |
| 2004/0073565 | A1 * | 4/2004 | Kaufman et al. | 707/101 |
| 2006/0252428 | A1 * | 11/2006 | Agashe et al. | 455/436 |
| 2007/0016943 | A1 * | 1/2007 | M'Raihi et al. | 726/9 |
| 2007/0050635 | A1 * | 3/2007 | Popp | 713/185 |
| 2007/0130472 | A1 * | 6/2007 | Buer et al. | 713/182 |
| 2008/0082447 | A1 * | 4/2008 | Jogand-Coulomb et al. | 705/53 |
| 2009/0037729 | A1 * | 2/2009 | Smith et al. | 713/158 |
| 2010/0325723 | A1 * | 12/2010 | Essawi et al. | 726/20 |
| 2012/0131655 | A1 * | 5/2012 | Bender et al. | 726/6 |
| 2012/0191513 | A1 * | 7/2012 | Ocher | 705/14.1 |

\* cited by examiner

*Primary Examiner* — Joseph P. Hirl
*Assistant Examiner* — John B King
(74) *Attorney, Agent, or Firm* — Lowenstein Sandler LLP

(57) ABSTRACT

A system for efficiently storing and activating credential seeds that are embedded in authentication devices. Device manufacturers provide copies of credential seeds embedded in the devices to an authentication service. The authentication service stores the credential seeds for authentication devices in a pre-active credential seed data store. When a credential seed is needed to perform a real-time or near real-time authentication of a One Time Password, the credential is fetched from the pre-active credential seed data store, used to authenticate the OTP and injected into the active credential seed data store, which can be a database. Thereafter, the credential seed is fetched from the active credential seed data store for real-time and near real-time authentication of OTPs. The credential seeds can be stored in the data stores with additional information, such as user profile data, permissions and authorizations, OTP authentication algorithm information, metadata, OTP moving factor data, time-to-live, and other attributes.

17 Claims, 3 Drawing Sheets

CREDENTIAL SEED PROVISIONING SYSTEM

BACKGROUND OF THE INVENTION

An authentication device such as a token can generate a One Time Password (OTP) based upon an embedded secret called a credential seed. The token can process the credential seed with other factors such as a timestamp to generate a unique OTP that is used once to authenticate the token holder.

When a token generates an OTP, it is sent with the token identifier to an authentication service provider. For example, an OTP and identifier can be sent from a customer to a bank to authenticate the customer for online banking. The bank can send the identifier, OTP and other factors (such as a timestamp) to a third party authentication service for authentication. The third party looks up the credential seed based upon the token identifier, computes its own version of the OTP and compares it to the OTP received form the bank. If the third party's version of the OTP corresponds to the one received from the bank, the third party sends a message to the bank indicating a successful authentication. If not, an authentication failure message is sent to the bank.

A token manufacturer generally provisions its tokens with credential seeds by preloading each token with one or more unique credential seeds at its time of manufacture. It sends copies of the credential seeds along with their corresponding token identifiers to the party hosting authentication service. The credential seeds and identifiers are indexed and stored by the authentication service for lookup when needed. When large numbers of credential seeds that may be from different manufacturers are stored, it requires a significant amount of memory and resources to index, store and look up a particular credential seed. When credential seed files become larger, it introduces undesirable latency into the lookup and OTP verification process. It would be desirable to keep credential seed lookup tables that are used for real-time or near real-time authentication of OTPs as small and efficient as possible so as to reduce the amount of memory required to store them and improve the timeliness with which OTPs may be looked up and verified.

Many of the credential seeds sent to the authentication service are dormant because many of the tokens with which they are associated are pre-active, e.g., they have not yet been issued to users. Thus, many of the credential seed records that are indexed and stored in lookup tables used for live OTP authentication are not relevant to a token lookup operation at the time an OTP is received for verification by the service. The large number of pre-active credential seeds mixed with the active seeds can slow the lookup of active seeds in response to requests for real-time or near real-time authentication of OTPs.

In addition to the lookup performance challenge, a relational database storage that is typically used to store credential seeds may also have capacity limitations.

What is needed is a more efficient way to store credential seeds to facilitate lookups and speed the authentication process for OTPs while handling large volume of credential seeds.

SUMMARY OF THE INVENTION

In accordance with an embodiment of the present invention, large volume of credential seeds are received from different device providers. An example of a device is a One Time Password generator. Each credential seed can be used to generate one or more One Time Passwords (OTP) on a device provided by the corresponding device provider, e.g., the device provider from whom the seed was received. The received credential seeds are stored in a first data store for seeds corresponding to inactive devices. An inactive device is one that has not been used for authentication and for which no indication has been received that is will be used for authentication. An indication is received that a device (or a credential seed for a device) is to be used for authentication. The credential seed is then stored in a second data store for seeds corresponding to active devices. An active device is one that been identified for use or that has already been used for authentication.

DETAILED DESCRIPTION

A manufacturer can embed one or more credential seeds in each authentication device that it makes. Each credential seed is used as a basis for calculating One Time Passwords (OTPs). Examples of an authentication device include a hardware token, an authentication device software application (e.g., running on a cell phone), a cloud-based authentication proxy agent for a user, etc. An authentication device embodied in one or more pieces of special purpose hardware is referred to as a hardware authentication device. An authentication device embodied in software running on general purpose or multi-purpose hardware is referred to as a virtual authentication device. An example of a virtual authentication device is the VIP Access Client made by Symantec. A virtual authentication device may run on one or more virtual machines.

Copies of embedded credential seeds can be provided to and stored for access by an Authentication Service Provider that authenticates OTPs or other indicia of authentication that are generated based upon one or more Credential Seeds. A Credential Seed can be active or pre-active. An active Credential Seed is one that has been used to authenticate an OTP at least once or that has been readied to authenticate an OTP. Active Credential Seeds can be stored in an Active Credential Seed Data Store for efficient lookup to verify an OTP in real-time or near real-time. Examples of an Active Credential Seed Data Store include an Active Credential Seed Database, which can be a Relational Database Management System (RDBMS), an in-memory database, or any suitable data storage system to support real-time or near real-time lookup of Credential Seeds to authenticate OTPs in response to authentication requests.

A Pre-Active Credential Data Store can be any device capable of storing electronic information such as Credential Seeds. An index or other searchable data structure or set of data structures can be constructed based upon the contents and/or structure of the data store. A Pre-Active Credential Data Store can be a flat file, a series of files arranged in a hierarchical fashion (such as in a directory structure), an in-memory database, a distributed database, or be comprised of any other arrangement suitable for storing information in a way that renders it efficiently accessible. Credential seeds can be grouped (e.g., into individual files) in a Pre-Active Credential Data Store. They can be grouped by manufacturer, by corresponding token identifier, by corresponding virtual device identifier, by creation date, by expiration date, by issuer identifier, by user identifier, etc. An Index Table can be created for a Pre-Active Credential Data Store. The Index Table can be any suitable mechanism for determining the location of one or more credential seeds in the Pre-Active Credential Data Store.

Figure 1:
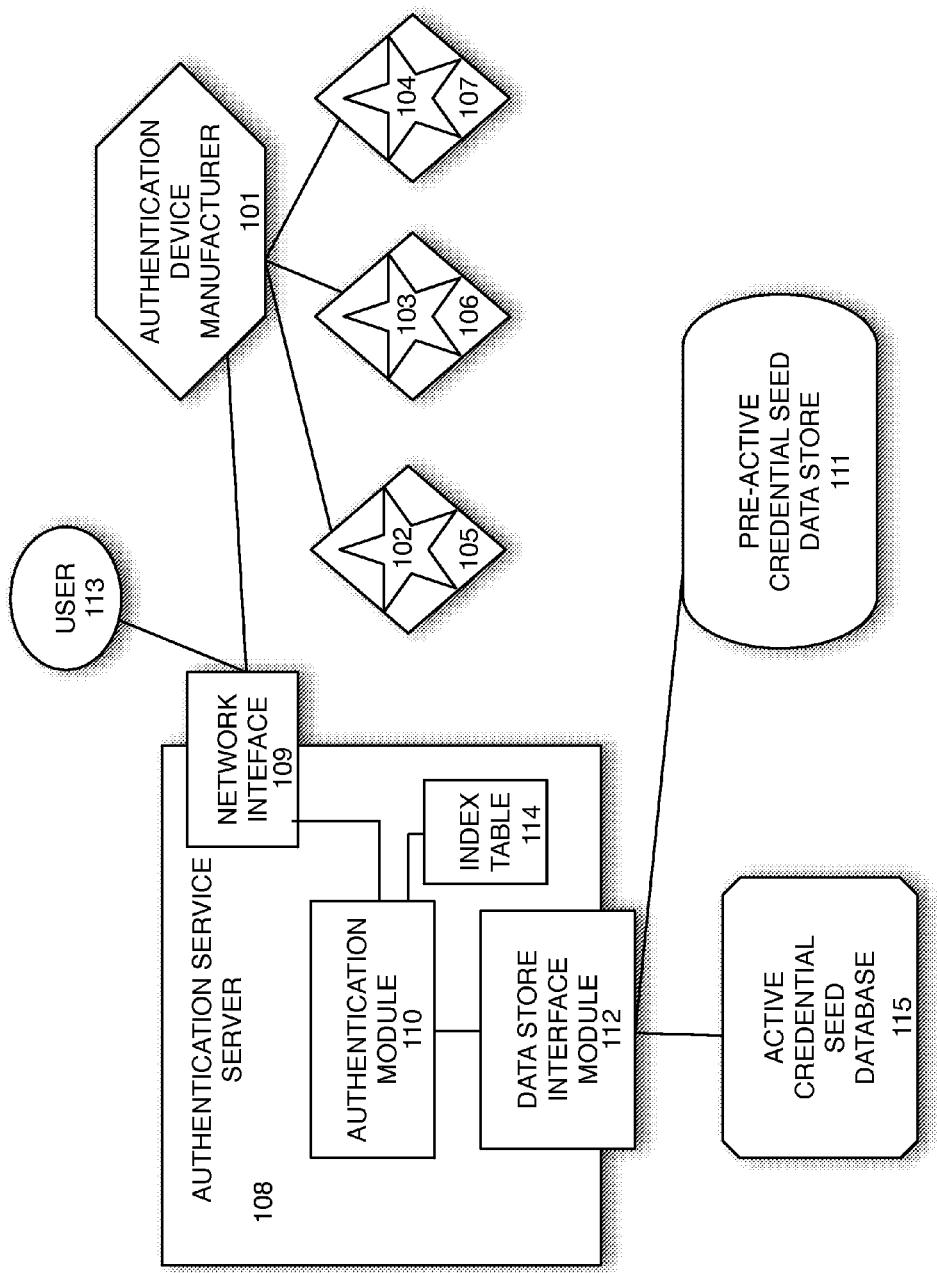
FIG. 1 shows a system that includes a pre-active credential seed data store and an active credential seed data store.

An embodiment of a credential seed storage system is shown in FIG. 1. An authentication device manufacturer 101 stores a unique credential seed (102, 103, 104) in each authentication device (105, 106, 107). Copies of the credential seeds are sent to Authentication Service Provider 108 via Network Interface 109 or through an out-of-band process. Authentication Module 110 stores the copies of the credential seeds along with other information in Pre-Active Credential Seed Data Store 111 via Data Store Interface Module 112. An embodiment can also include a Credential Seed Loader Module (not shown) that can receive credential seeds through the out-of-band process and store them in Pre-Active Credential Seed Data Store 111. When Authentication Service Server 108 receives a request from User 113 to authenticate an OTP generated by a given authentication device, Authentication Module 110 consults the Index Table 114 to locate the credential seed, fetches the credential seed for the authentication device from the Pre-Active Credential Seed Data Store 111 via the Data Store Interface Module 112, authenticates the OTP, and then causes a copy of the credential seed to be stored in the Active Credential Seed Database 115.

The Pre-Active Credential Data Store and the Index Table can be created and maintained by an Authentication Service Provider that can receive credential seeds from authentication device manufacturers and/or others. The Authentication Service can also receive requests from Users to authenticate an OTP and/or to activate an authentication device. The request can include the OTP and an authentication device identifier and/or other data sufficient to identify the credential seed needed to perform the authentication and/or activate the authentication device.

The Authentication Service can authenticate the OTP by fetching its corresponding credential seed and computing its own version of the OTP. Other data, which may be stored in the Active Credential Data Store and/or the Pre-Active Credential Data Store (such as information about the user, the user's network address, fraud detection and prevention data, etc.) or obtained from other sources (e.g., the current time and date obtained from a clock) can be used to authentication (verify) the OTP. The computed OTP is compared to the received OTP. If they correspond (e.g., if they match), then the OTP is successfully authenticated. If they do not correspond, then an authentication failure message can be generated by the Authentication Service. If the authentication is successful, the Authentication Service can activate the credential seed by injecting it into an Active Credential Seed Data Store (such as an Active Credential Seed Database) for efficient lookup for subsequent authentication requests that correspond to that authentication device identifier. If an activation request is received, then the credential seed can be injected into the Active Credential Seed Data Store without necessarily authenticating an OTP. Such an activation request may, but need not, include an OTP. A credential seed may be activated (injected into the Active Credential Data Store) based upon any suitable event. For example, a credential seed may by activated a given amount of time after it is stored in the Pre-Active Credential Seed Data Store, upon detecting that the number of credential seeds from a given manufacturer in the Active Credential Data Store falls below a predetermined threshold, etc.

Figure 2:
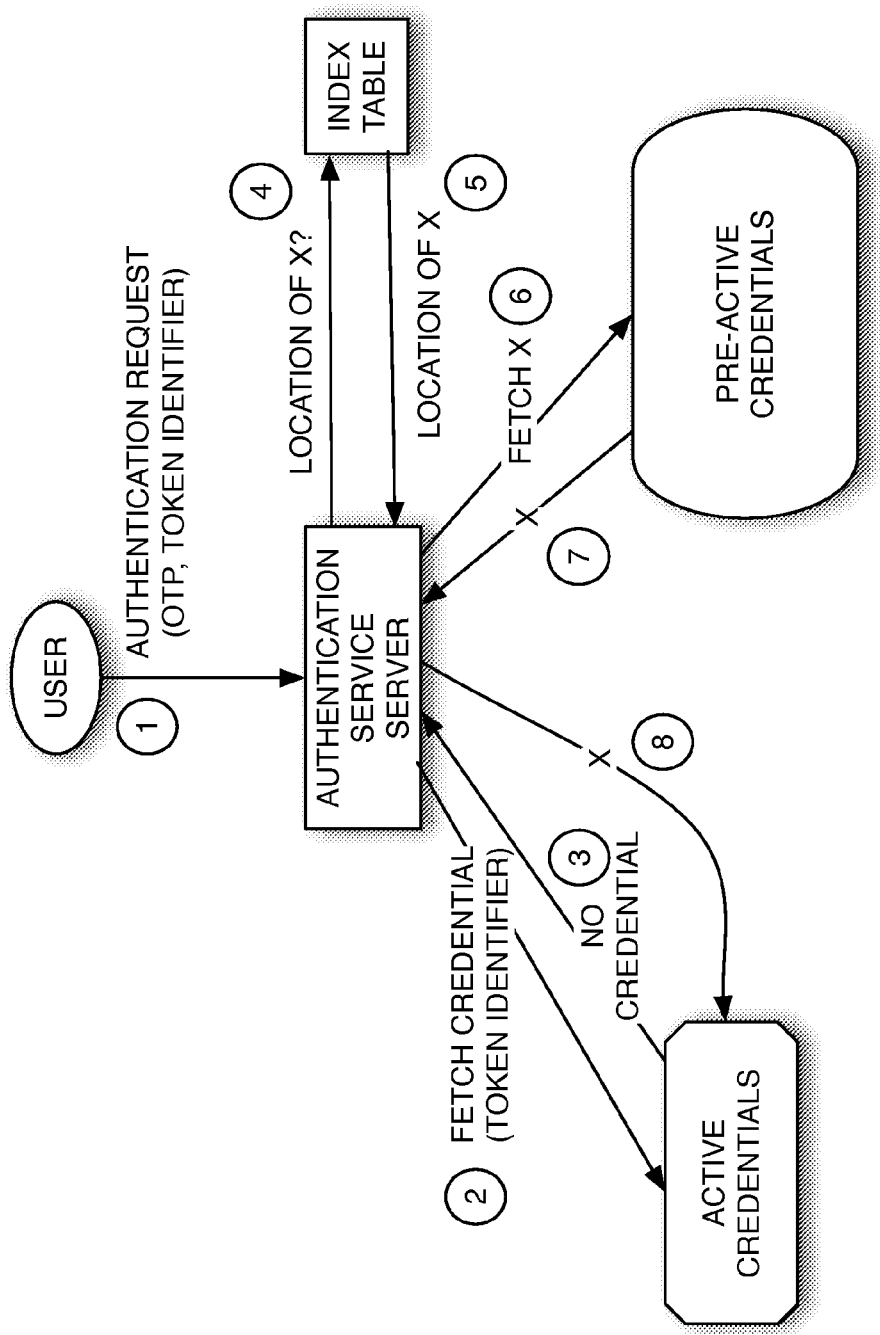
FIG. 2 shows a credential seed moved from a pre-active credential data store to an active credential seed database in response to an authentication request from a user.

FIG. 2 shows an embodiment where a user sends an authentication request to an Authentication Service server. The request can include a token identifier, OTP and other information that may be useful in authenticating the OTP, depending upon the algorithm used. The Authentication Service queries the active Credential Seed Database (e.g., based upon the token identifier) for the Credential Seed and receives a response indicating that the requested Credential Seed is not stored in the Active Credential Seed Database. The Authentication Service can then query the Index Table to determine the location of the credential in the Pre-Active Credential Seed Data Store. If the Index Table indicates that the Credential Seed is not in the Pre-Active Credential Seed Data Store, then an error message (not shown) can be sent to the User. If the Index Table indicates a location, the Credential Seed can be fetched from the Pre-Active Credential Seed Data Store and can be used by the Authentication Service to authenticate the OTP (not shown). Then the Authentication Service can inject the Credential Seed into the Active Credential Database so that it is available for easy lookup for the next authentication request corresponding to that token identifier.

Figure 3:
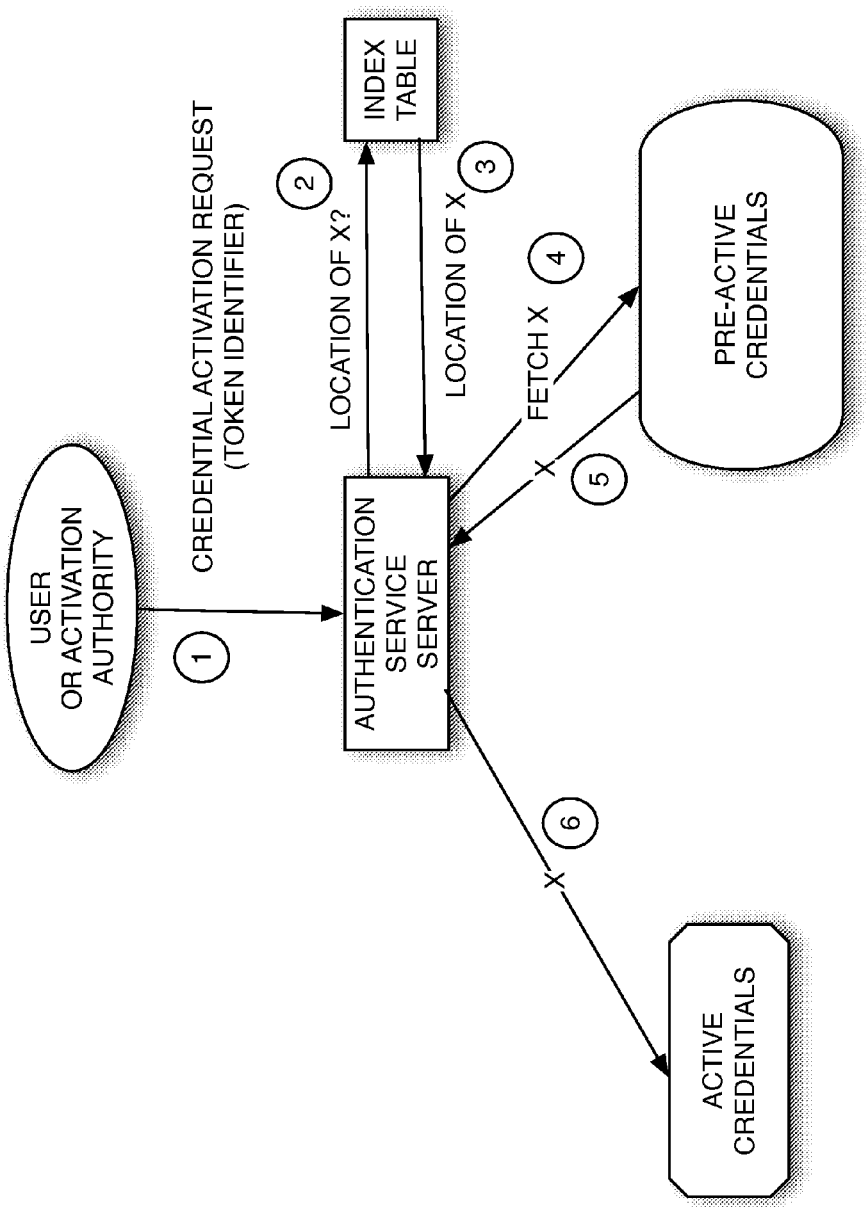
FIG. 3 shows a credential seed moved from a pre-active credential data store to an active credential database in response to a request to activate the credential seed from a user or from an activation authority.

FIG. 3 shows an embodiment where a credential activation request from a User or Activation Authority is received at the Authentication Server. The User can be an end user (a person, a software application, etc.) of a token having a token identifier. An Activation Authority can be any entity authorized to activate a token or other credential-based authentication entity, such as a software application. An example of an Activation Authority is an enterprise authentication agent acting on behalf of an enterprise that issues tokens to its employees and/or customers. The activation request can include a token identifier and/or other information useful for identifying the Credential Seed used by the authentication device (token, software application, etc.) sought to be activated. Upon receiving the activation request, the Authentication Service can search the Index Table to determine the location of the Credential Seed in the Pre-Active Credential Seed Data Store. If no such Credential Seed is found in the Index Table, an error message (not shown) can be returned by the Authentication Service to the User or Activation Authority. If a valid location is returned, the Authentication Service can fetch the Credential Seed from the Pre-Active Credential Seed Data Store and inject the credential into the Active Credential Seed Database.

The Pre-Active Credential Seed Data Store can include one or more tables in a database. For example, the table or tables comprising the Pre-Active Credential Seed Data Store can exist in the same database as the table or tables comprising the Active Credential Seed Data Store. Either or both types of Data Store can store information in addition to credential identifiers and credential seeds. For example, a Data Store can store the name of a user associated with a hardware or virtual authentication device, the name of a company, authentication device user profile data, user permissions and authorizations, other attributes, etc. User permissions and authorizations can specify types or categories of information that the user has authority to access or specific items of information or pointers to specific items of information. Either Data Store can store metadata pertaining to a Credential Seed, users, issuers, manufacturers, permissions, authorizations, OTP authentication algorithms used, security level, OTP Time-To-Live, moving factor data (time, event counter) and so on.

A Credential Seed (a Master Credential Seed) can be linked to one or more other Credential Seeds (Linked Credential Seeds), e.g., that can be identified in a record containing or associated with the Credential Seed, using a linked list, etc. When a Master Credential Seed is activated, the Linked Credential Seeds can also be automatically activated.

A cleanup function optionally deletes credential records from the pre-active credential seed data store after they are injected into the active credential seed data store. Likewise, the system can transfer a credential seed from the active credential seed database to the pre-active credential seed data store upon the occurrence of any appropriate triggering event, such as the temporary retirement of an authentication device. For example, when a employee to whom an authentication device leaves his company, he returns his authentication device, which is then temporarily de-activated. It may be subsequently issued to another employee, such as a new employee. At that time, the credential seed for the device can once again be injected into the active credential seed database and can be deleted from the pre-active credential seed database.

The present system transforms the state of data-storing machines that carry the pre-active and active credential seed data stores in accordance with authentication device activations and de-activations. This occurs as credential seed records are added and removed from each data store and how data other than the credential seeds themselves is manipulated in the records. For example, attributes included in a credential seed record such as OTP algorithm, moving factors, permissions and authorizations may be changed from time to time.

More generally, various embodiments may include or be embodied in the form of computer-implemented processes and apparatuses for practicing those processes. Embodiments also may be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the described subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the described subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the technique in accordance with the described subject matter in hardware and/or firmware. The processor may be coupled to memory, such as RAM, ROM, flash memory, a hard disk or any other device capable of storing electronic information. The memory may store instructions adapted to be executed by the processor to perform the technique in accordance with an embodiment of the described subject matter.

Any of the functionality described herein may be implemented by modules, which can be software, hardware and/or a combination thereof. A module can perform a single function, multiple functions or a function may be partially performed by each of a number of modules. For example, a credential seed may be allocated and stored to a pre-active credential seed data store by an authentication module, which also authenticates OTPs. Alternatively, a credential seed may be allocated and stored to a pre-active credential seed data store by a credential seed allocation module that is separate from the authentication module. Further, the authentication module and the credential seed allocation module may run on different machines that may be controlled by different parties. For example, the authentication module may run on the authentication service server that is controlled by a third party authentication service and the allocation module may run on a computer controlled by the authentication device manufacturer. Likewise, the system for storing, indexing, locating, fetching and injecting credential seeds and related data into pre-active and active credential seed data stores may be implemented as Software as a Service (SaaS) in the cloud. The functionality thereof may be implemented using virtualized machines across multiple computers and data centers in multiple locations. The data stores and databases may be monolithic or distributed across numerous machines and locations.

Examples provided herein are merely illustrative and are not meant to be an exhaustive list of all possible embodiments, applications, or modifications of the described subject matter. Thus, various modifications and variations of the described techniques and systems of the described subject matter will be apparent to those skilled in the art without departing from the scope and spirit of the described subject matter.

Although the subject matter herein has been described in connection with specific embodiments, it should be understood that the described subject matter as claimed should not be unduly limited to such specific embodiments. Indeed, various modifications of the described modes for carrying out the described subject matter which are obvious to those skilled in the relevant arts or fields are intended to be within the scope of the appended claims.

The invention claimed is:

1. A method comprising:
receiving a plurality of credential seeds, each credential seed suitable for generating a one time password;
storing the plurality of credential seeds in a pre-active data store;
receiving an indication that a first one of the plurality of credential seeds is to be activated, the indication including an authentication device identifier;
locating the first one of the plurality of credential seeds to be activated in the pre-active data store based upon the authentication device identifier;
reading the first one of the plurality of credential seeds to be activated from the pre-active data store; and
activating, by a computer, the first one of the plurality of credential seeds by storing a copy of the first one of the plurality of credential seeds in an active data store in response to the indication that the one of the plurality of credential seeds is to be activated.

2. The method of claim 1, wherein receiving the indication comprises receiving a request to authenticate the one time password an OTP, the request including the authentication device identifier.

3. The method of claim 1, wherein receiving the indication indicates a request to activate the first one of the plurality of credential seeds based upon the authentication device identifier.

4. The method of claim 2, further comprising authenticating the one time password based upon the first one of the plurality of credential seeds from the pre-active data store.

5. The method of claim 1, wherein the pre-active data store comprises one or more flat files.

6. The method of claim 1, wherein the active data store comprises at least one table in a relational database.

7. The method of claim 1, wherein the active data store further stores at least one from the group of a manufacturer identifier, a token identifier and an authentication algorithm identifier.

8. The method of claim 1, wherein locating the first one of the plurality of credential seeds to be activated comprises searching an index table.

9. The method of claim 1, wherein the plurality of credential seeds stored in the pre-active data store are linked in a group such that activating one credential seed automatically activates the other credential seeds in the group.

10. A system comprising:
    a pre-active data store storing a plurality of non-active credential seeds, each credential seed being suitable for generating a one time password for use by an authentication device;
    an active data store storing a plurality of active credential seeds;
    an index table that indicates the locations of the plurality of non-active credential seeds in the pre-active data store;
    an authentication module in communication with the index table, where the authentication module receives an indication to activate a credential seed, consults the index table, locates the credential seed to be activated and activates the credential seed by sending instructions to fetch the credential seed from the pre-active data store and store a copy of the credential seed in the active data store; and
    a data store interface module in communication with the pre-active data store, the active data store and the authentication module, where the data store receives instructions from the authentication module to fetch the credential seed from a data store and store a copy of the credential seed in a data store.

11. The system of claim 10, wherein the pre-active data store comprises at least one flat file.

12. The system of claim 10, wherein the active data store comprises at least one table in a relational database.

13. The system of claim 10, wherein the authentication module authenticates the one time password.

14. The system of claim 10, further comprising a credential seed loader module that receives credential seeds through an out-of-band channel and causes the credential seeds to be stored in the pre-active data store.

15. A non-transitory computer readable medium storing a plurality of instructions that cause a computer to perform a method comprising:
    receiving a plurality of credential seeds, each credential seed suitable for generating a being suitable for generating a one time password;
    storing the plurality of credential seeds in a pre-active data store;
    receiving an indication that a first one of the plurality of credential seeds is to be activated, the indication including an authentication device identifier;
    locating the first one of the plurality of credential seeds to be activated in the pre-active data store based upon the authentication device identifier;
    reading the first one of the plurality of credential seeds to be activated from the pre-active data store; and
    activating the first one of a the plurality of credential seeds by storing a copy of the first one of the plurality of credential seeds in an active data store in response.

16. The non-transitory computer readable medium of claim 15 storing a plurality of instructions that cause a computer to further perform a method comprising receiving a request to authenticate an one time password.

17. The non-transitory computer readable medium of claim 15 storing a plurality of instructions that cause a computer to further perform a method comprising authenticating a one time password.

* * * * *